United States Patent [19]

Parks

[11] Patent Number: 5,022,615
[45] Date of Patent: Jun. 11, 1991

[54] COMMUNICATION WIRE SUPPORT APPARATUS

[76] Inventor: Thomas L. Parks, 10804 St. Anton Cir., Glen Allen, Va. 23060

[21] Appl. No.: 524,724

[22] Filed: May 17, 1990

[51] Int. Cl.⁵ .............................................. F16L 3/08
[52] U.S. Cl. .................................. 248/74.1; 248/68.1; 248/71
[58] Field of Search ............................ 248/74.1–74.3, 248/68.1, 71, 69; 24/20 LS, 21

[56] References Cited

U.S. PATENT DOCUMENTS

| | | | |
|---|---|---|---|
| 792,594 | 6/1905 | Hiss, Jr. .................................. | 248/71 |
| 1,602,503 | 10/1926 | Pleister et al. . | |
| 1,763,060 | 6/1930 | Meyer . | |
| 1,804,807 | 5/1931 | Pleister et al. . | |
| 3,155,355 | 11/1964 | Cappola ............................ | 248/74.3 |
| 3,295,807 | 1/1967 | Von Volkli ..................... | 248/74.1 X |
| 3,432,129 | 3/1969 | Santucci . | |
| 3,675,283 | 7/1972 | Gregorovic ................... | 248/74.3 X |
| 4,372,511 | 2/1983 | Knowles ............................ | 248/68.1 |

FOREIGN PATENT DOCUMENTS 3716327 11/1968 Fed. Rep. of Germany ..... 248/74.1

Primary Examiner—Alvin C. Chin-Shue

[57] ABSTRACT

A support apparatus (10) for supporting and suspending a bundle (200) of communication wires (201) from an external support (100) wherein the apparatus (10) comprises a threaded fastener member (14) secured to one end (17) of a ring member (16) and an auxiliary locking unit (13) for frictionally engaging both overlapped ends (17, 18) of the ring member (16) into tight frictional engagement with one another.

1 Claim, 1 Drawing Sheet

COMMUNICATION WIRE SUPPORT APPARATUS

TECHNICAL FIELD

The present invention relates to the field of suspended article support devices in general, and in particular to a wire ring support apparatus specifically designed to support communication wires.

BACKGROUND ART

This invention was the subjected matter of Document Disclosure Program Registration No. 190,934 which was filed in the U.S. Patent and Trademark Office on Apr. 18, 1988.

As can be seen by reference to the following U.S. Pat. Nos. 1,602,503; 1,763,060; 1,804,807; and 3,432,129; the prior art is replete with myriad and diverse ring type support devices for suspending different articles.

While all of the aforementioned prior constructions are more than adequate for the basic purposes and function for which they have been specifically designed, these patented structures are uniformly deficient with respect to the fact that none of the prior art constructions provide a positive locking arrangement for the ring opening. Only the Santucci patent '129 even bothers to enhance the frictional engagement between the respective ends of the ring wherein even in this patented arrangement an externally applied force may easily disengage the ends of the ring support.

As a consequence of the foregoing situation, there has existed a longstanding need among those individuals having to deal with ring type supports on a regular basis for an auxiliary positive locking arrangement between the cooperating ends of the ring support which will insure that the respective ends of the support are retained in their locked position and the provision of such a construction is a stated objective of the present invention.

DISCLOSURE OF THE INVENTION

Briefly stated, the communication wire support apparatus that forms the basis of the present invention comprises in general, a securing unit, a ring unit, and an auxiliary locking unit.

The securing unit comprises a threaded fastening member which is used to secure the apparatus to an overhead support.

The ring unit is formed integrally with the securing unit and comprises a generally C-shaped ring member having a captive end attached to the securing unit, and a free end which is intended to be joined to the captive end to close the ring member around a bundle of elongated strands, such as communication wires or the like.

As will be explained in greater detail further on in the specification, the auxiliary locking unit comprises an auxiliary closed loop clamp member which is dimensioned to receive both the free end and the captive end of the ring member to join the overlapping ends of the ring member together into tight frictional engagement with one another.

This auxiliary locking unit provides a safe and secure means of insuring that the joined ends of the ring member will remain engaged in a captive relationship relative to a bundle of communication wires or the like.

BRIEF DESCRIPTION OF THE DRAWINGS

These and other attributes of the invention will become more clear upon a thorough study of the following description of the best mode for carrying out the invention, particularly when reviewed in conjuction with the drawings, wherein.

BEST MODE FOR CARRYING OUT THE INVENTION

Figure 4:
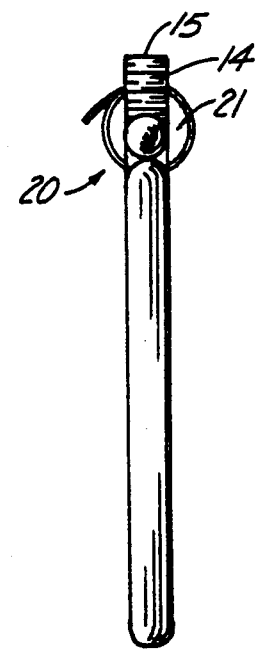
FIG. 4 is a side plan view of the apparatus in the closed position.
Figure 5:
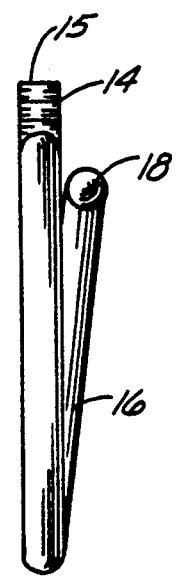
FIG. 5 is a side plan view of the apparatus in the open position.

As can be seen by reference to the drawings, and in particular to FIGS. 4 and 5, the communication wire support apparatus that forms the basis of the present invention is designated generally by the reference numeral (10). The apparatus (10) comprises in general, a securing unit (11), a ring unit (12), and auxiliary locking unit (13). These units will now be described in seriatim fashion.

Figure 1:
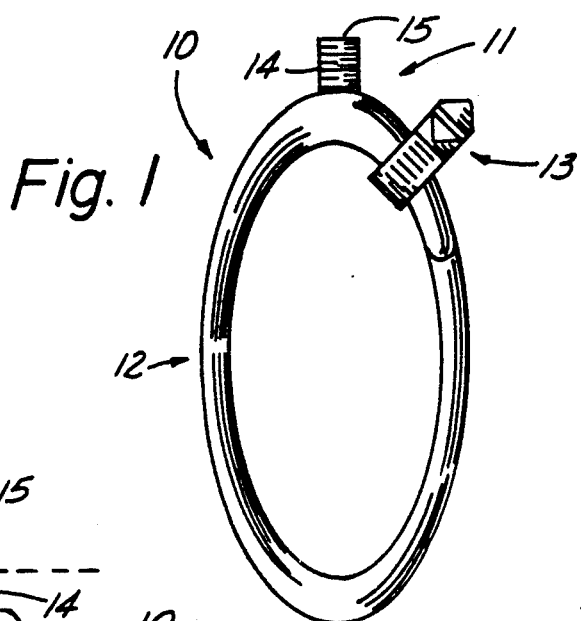
FIG. 1 is a perspective view of the apparatus.
Figure 2:
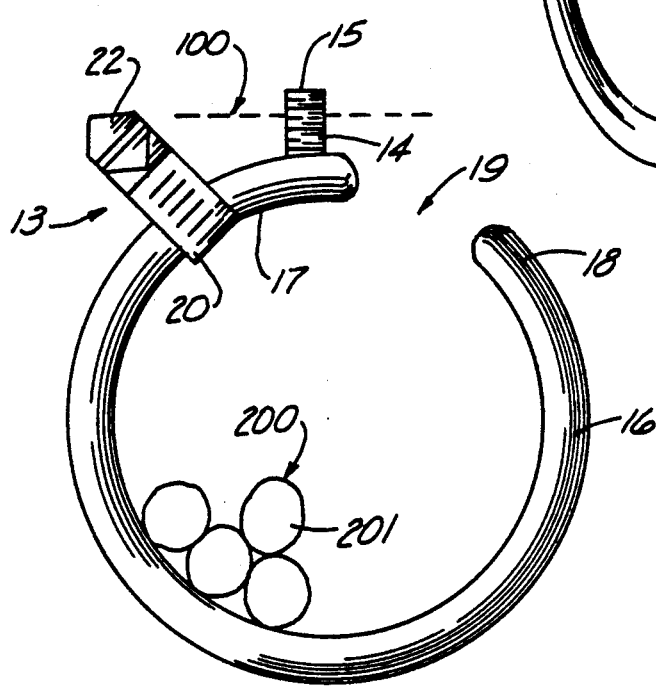
FIG. 2 is a front plan view of the securing unit and ring unit in the open disposition.
Figure 3:
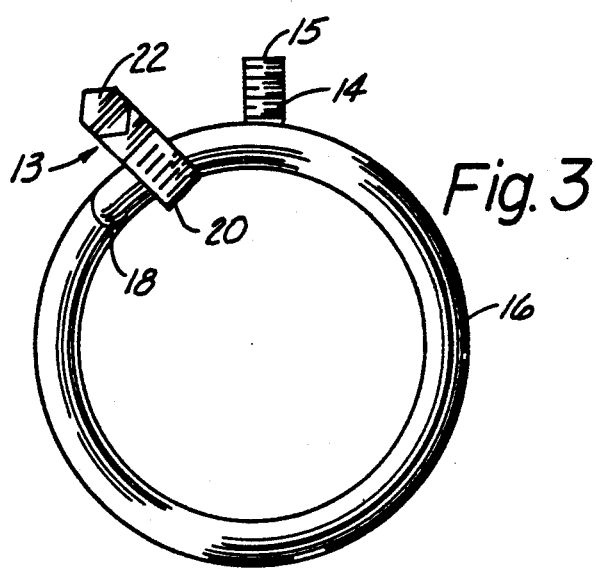
FIG. 3 is a front plan view of the securing unit and ring unit in the closed disposition.

Turning now to FIGS. 1 through 3, it can be seen that the securing unit (11) comprises a threaded fastener member (14) which is formed integrally with, and projects outwardly from the ring unit (12). The threaded fastener member (14) may comprise a tapered screw element (15) and the threaded fastener member (14) is used to secure the apparatus (10) to an independent support (100) depicted in phantom in FIG. 2 to suspend a bundle of cables (200) at an elevated location.

The ring unit (12) comprises a generally C-shaped ring member (16) having a captive end (17) secured to the fastener member (14) and a free end (18) which cooperates with the captive end (17) to define a ring member opening (19). Ring member opening (19) is dimensioned to receive the individual strands of communication wire (201) that comprise the bundle of cables (200).

As can best be seen by reference to FIGS. 4 and 5, the auxiliary locking unit (13) comprises a clamp member (20) forming a closed loop (21) and an adjustment means (22) for varying the size of the closed loop (21).

In the operation of the apparatus (10), the auxiliary locking unit (13) is engaged with the ring unit (12) by slipping the loop (21) of the locking unit over the free end (18) of the ring member (16) and sliding the clamp member (20) to a location proximate the captive end (17) of the ring member (16).

At this point, the securing unit (11) is attached to a support (100) in a well recognized manner and the communication wires (201) are introduced into the ring member (16) through the opening (19).

Then the free end (18) of the ring member (16) is inserted into the loop (21) of the clamp member (20) and the adjustment means (22) are actuated to produce a tight frictional engagement between the clamp member (20) and the ends (17, 18) of the ring member.

By now it should be appreciated that the presence of the auxiliary locking unit (13) virtually assures that the ends (17, 18) of the ring member (16) will remain in their frictionally engaged disposition around the bundle of cable (200) to accomplish the stated objectives of this invention.

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

I claim:

1. A communication wire support apparatus for supporting a bundle of cables wherein the apparatus consists of:

a securing unit including a fastening member;

a ring unit including a generally resilient C-shaped ring member having a free end and a captive end operatively connected to said fastening member wherein said free end said captive end define a ring opening; whereby, said free end is dimensioned to overlap said captive end in an offset manner and an auxiliary locking unit including a clamp member forming a closed loop and adjustment means for varying the size of the closed loop to bring the clamp member into tight frictional engagement with the overlapping free and captive ends of the ring member.

* * * * *